Patented Sept. 14, 1943

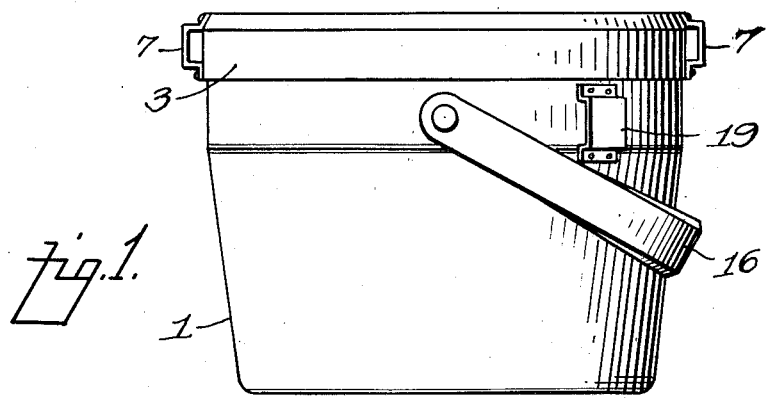
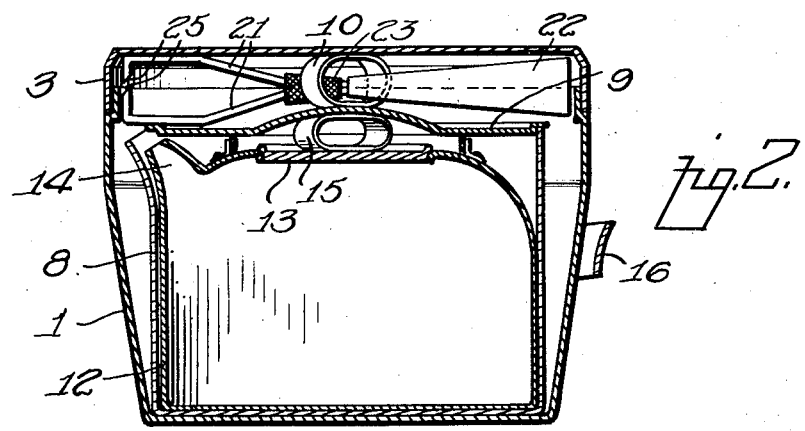
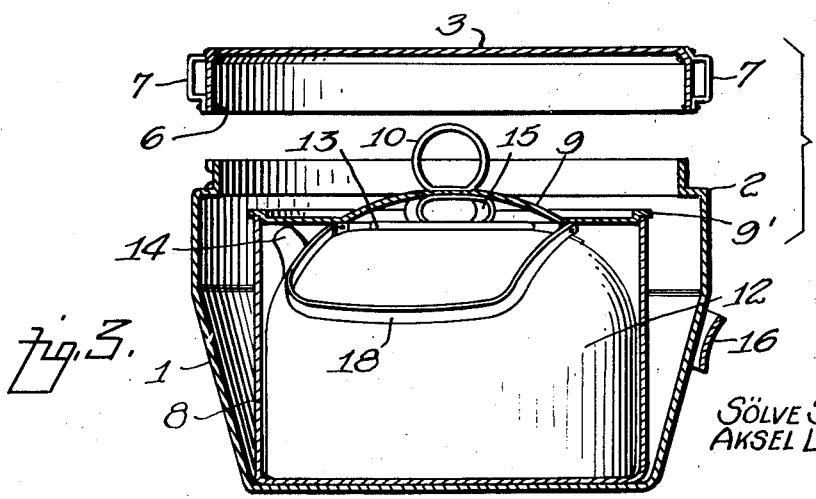

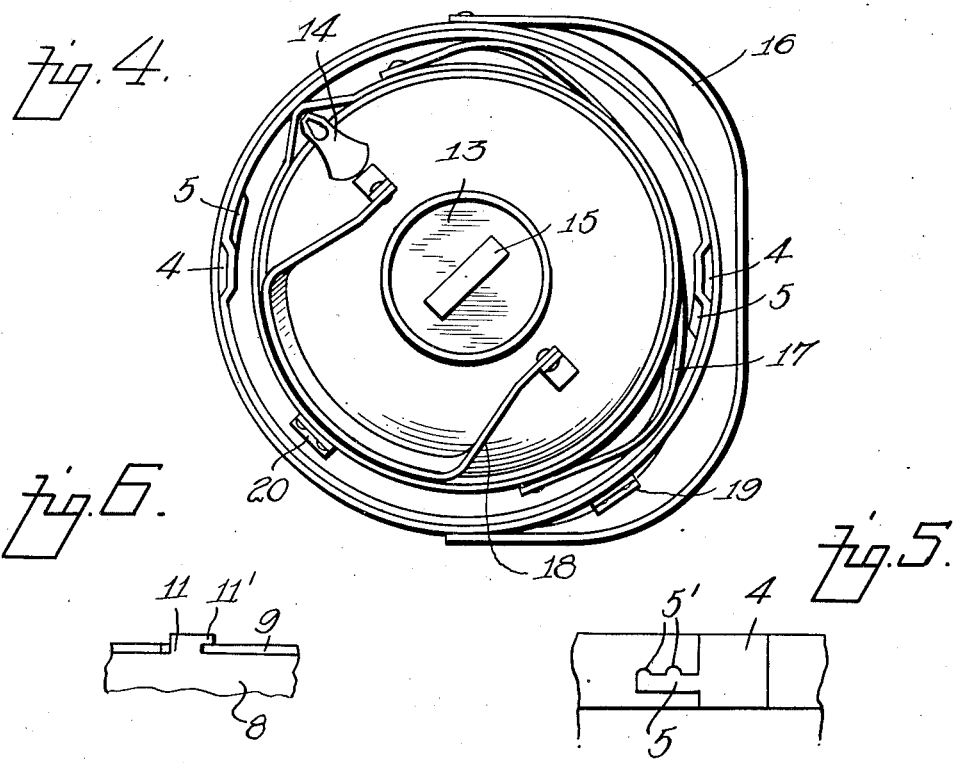
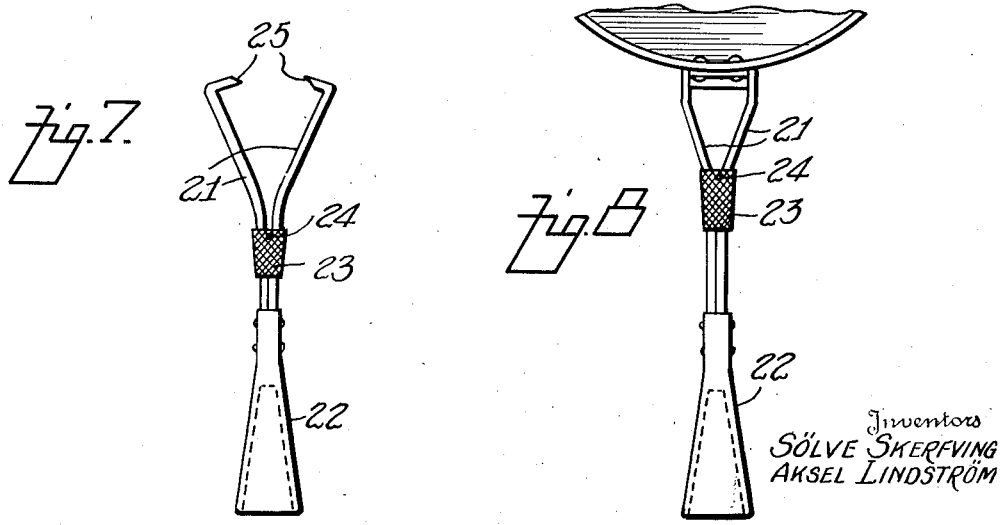

2,329,422

UNITED STATES PATENT OFFICE 2,329,422

CAMP KIT

Sölve Skerfving, Malmo, and Aksel Lindström, Dvarsatt, Sweden

Application October 7, 1940, Serial No. 360,182
In Sweden May 4, 1938

3 Claims. (Cl. 206—4)

The present invention refers to a camping kit which is composed of a plurality of culinary vessels and similar units, such as saucepan, tea and coffee kettles and frying pan, provided with lids and adapted to be placed within each other.

The principal object of the invention is to provide a camping kit of this type in which the various elements are firmly but resiliently held together when placed within each other so that rattling of the elements during transport is completely avoided.

Another object of the invention is to provide a camping kit in which the elements may be loosely assembled within each other and then simultaneously locked together by a single member and, conversely, may be disassembled after releasing said locking member.

It is a further object of the invention to provide a camping kit in the form of a self-contained unit in which the inner culinary vessels and the associated lids are firmly but resiliently held together within the outermost vessel which also forms a casing of the whole camping kit, the lid of said outermost vessel serving as a locking member for holding the inner elements together, the arrangement being such that after removing said locking member or lid all the inner elements may be freely taken out.

It is a still further object of the invention to provide a camping kit in which the lid of the outermost vessel is adapted to serve as a frying pan.

The invention will be more particularly described with reference to the accompanying drawings, which, by way of example, illustrate a preferred form of the camping kit according to the invention. In the drawings, Fig. 1 is an elevation of the camping kit when assembled;

Fig. 2 is a vertical section through the assembled camping kit;

Fig. 3 is a vertical view of the camping kit with the outer vessels shown in section but the innermost vessel shown in elevation and the lid of the outermost vessel, also seen in section, lifted off;

Fig. 4 is a plan view of the camping kit with the lids of the two outermost vessels removed;

Fig. 5 shows a locking means between the outermost vessel and the lid thereof;

Fig. 6 shows another locking means between an inner vessel and the lid thereof; and Figs. 7 and 8 show a handle adapted to be mounted on the vessels, in free and mounted condition, respectively.

Referring to the drawings, the camping kit comprises three vessels placed within each other and a frying pan which forms a cover over said vessels in a manner to be described below. The outermost vessel 1 consists of a saucepan which is fully open at the top and the peripheral wall of which, at least on its lower part, preferably is slightly tapering towards the smooth or plane bottom as will be clearly seen from Figures 1, 2, and 3. The upper part of the peripheral wall of the saucepan is preferably cylindrical, and at the very edge of the saucepan the peripheral wall has an inwardly offset portion around the whole periphery so as to form a ledge 2 against which a lid 3 may be placed in position. The lid 3 at the same time forms the frying pan referred to above which serves as a cover for all the inner vessels, and said lid has the shape of a shallow cylinder with plane bottom which closely fits over the offset upper edge of the saucepan 1 and may be locked to the latter by means of a kind of bayonet catch. This catch or locking means is shown separately in Figures 4 and 5 and is made by forming two diametrically opposite depressions 4 at the edge of the saucepan down to the ledge 2, said depressions having a lateral extension 5 which is situated slightly above the ledge 2 and has two upturned notches at 5' to form locking positions for projections 6 provided on the inside of the lid 3 near the edge thereof. Said projections are clearly to be seen in Figure 3 and consists of the heads of rivets by which two vertically arranged staples 7 are fastened opposite each other on the outside of the lid. The staples may be used as handles, if desired, but preferably serve as means for mounting a removable handle of a construction which will be described in the following.

The intermediate vessel 8 consists of a cylindrical tea kettle likewise having a plane bottom, said tea kettle fitting within the outermost vessel or saucepan 1, so that there is only quite a small space between the two vessels at the bottoms thereof, said space being sufficient to permit the provision of an intermediate thin layer of fabric or paper to avoid sooting of the inside of the outer vessel. The tea kettle 8 is wholly open at the top but has a lid 9 intended to be placed over the edge of the kettle by means of a rim 9' which forms a ledge engaging said edge on the inside. At two opposite points on the edge of the tea kettle 8 upwardly extending projections 11 are provided which on one side have a hook or claw 11'. The lid 9 is provided with two recesses in the edge corresponding to these projections, the latter extending through said recesses when the lid is placed in position. By turning the lid after placing it with the recesses over the projections 11 through a small angle in one direction, the hooks 11' will engage over the lid and hold it. The projections 11 and said recesses thus form a locking means for the lid 9. In the centre said lid 9 is upwardly curved or bulging and provided with a ring 10 preferably made from stainless spring steel which is welded or riveted to the lid as shown in Figure 3 and serves as a gripping means for the same. When the lid 3 of the saucepan is placed in position, it holds the elastic ring 10 compressed or flattened, as shown in Figure 2. On the one hand, the lid 9 of the tea kettle 8 is thereby held in engagement with the latter, and on the other hand, the reaction of the ring 10 forces the outer lid or frying pan 3 upwardly, so that the projections or heads 6 enter the notches 5' and hold the lid 3 in its proper position. Thereby clatter or rattling due to the shaking or vibration of the vessels during transport is prevented.

The innermost vessel 12 consists of a coffee kettle having a plane bottom and a cylindrical peripheral wall which at the top is bent radially inwardly in the usual manner forming an opening or mouth which is intended to be closed by a lid 13. When the kettle 12 is inserted in the tea kettle 8, there is also a small space between these vessels of sufficient size to permit the provision of an intermediate layer of fabric or paper. The coffee kettle has a short spout 14 which does not extend substantially beyond the peripheral wall so as not to prevent the insertion of the coffee kettle in the tea kettle. Preferably, the tea kettle may be provided with a small overflow spout, as shown in the figures, in which the spout 14 of the coffee kettle may be positioned when assembling the vessels. The lid 13 of the coffee kettle is, in a manner similar to that of the lid of the tea kettle, provided with an elastic ring 15 which is compressed or flattened by the lid 9 when the latter is in position on the tea kettle, as will be seen from Figures 2 and 3, and thereby assists in maintaining the lids 9 and 13 in their positions. The ring 15 at the same time serves as a gripping means for the lid 13.

All three vessels 1, 8, and 12 are provided with bows 16, 17 and 18, respectively, for their carrying or suspension over an open fire, said bows being pivotally mounted on the vessels in the usual manner. The bows 17 and 18 of the two inner vessels, i. e. the tea kettle 8 and the coffee kettle 12, are of such size and shape that, when swung down, they resiliently engage the inside of the next outer vessel with a slight pressure to prevent shaking and noise caused thereby.

The saucepan 1 and the tea kettle 8 are on the outside provided with vertically arranged staples 19 and 20, respectively of the same kind as those provided on the frying pan or lid 3. In these staples a handle such as shown in Figure 7 may be fastened in the manner shown in Figure 8. To prevent the bows 16 and 17 from turning over at the tilting of the vessels the staples are mounted at such points that the bows will rest against the handle at the tilting operation, if they are swung down under the staples as shown in Figure 1 when the handle is mounted. The bows are consequently locked between the lower part of the vessels and the handle. The handle consists of two elastic legs 21 made for example from stainless spring steel, which are connected with each other at one end by a handle portion 22. This portion may preferably be made from aluminium and insulated with a material suitable therefor. If desired, it may be made hollow at the free end to permit the mounting of an extension shaft. On the legs 21 a sleeve 23 is slidably mounted which, when moved towards the free ends of the legs, presses the latter together. A pin 24 traversing the sleeve 23 between the legs 21 moves the legs away from each other at the retraction of the sleeve. The legs 21 are further provided with hooks 25 on their outer free ends said hooks being turned inwardly towards each other and adapted to enter one of the staples 7, 19 or 20 from either side thereof, when the legs are bent towards each other by means of the sleeve 23, the legs being of the same width as the inner height of the staples, so that the handle will be rigidly connected with the vessel in question, when the sleeve 23 has been slid forwardly as far as possible. The hooks 25 are preferably bevelled one on the inside and the other on the outside so as to engage each other along an oblique surface. The size of the handle is so chosen that, as shown in Figure 2, it may be placed on the lid 9 passing through the ring 10 and the outer lid 3 nevertheless be put on and locked in the manner previously described. The handle may be placed with the legs one above the other, whereby it will be held firmly between the other elements by the elastic spreading of the legs.

It will be evident that the invention is not limited to the above described embodiment of a camping kit comprising three vessels fitting within each other and a lid serving as a frying pan. On the contrary, the vessels may be only two in number or more than three, the essential feature being the provision of elastic means between the lids of the various vessels to prevent displacements of the latter in relation to each other or shaking with accompanying noise. Furthermore, the shape and character of the vessels may be otherwise than here described.

What we claim and desire to secure by Letters Patent is:

1. A camping kit comprising an outer open top culinary vessel having side walls flaring outwardly and upwardly from the bottom and being substantially vertical adjacent the upper edge thereof, an intermediate vessel having a bottom dimensioned to nest within the bottom of the outer vessel and a part projecting laterally from a side thereof and accommodated within the enlarged upper portion of the outer vessel, an inner vessel in the form of a kettle nested within the intermediate vessel and having an integral spout received within the projecting part of the intermediate vessel, the upper edges of the walls of the outer vessel being inwardly offset at the upper edge thereof to provide a closure receiving shoulder and an opening larger than the bottom to enable the unrestricted insertion and removal of the intermediate vessel, and a closure mounted on the shoulder provided on the outer vessel, each of said intermediate and inner vessels being only slightly smaller than and occupying substantially the whole of the interior of the vessel in which it is nested.

2. A camping kit comprising an outer open top culinary vessel having side walls flaring outwardly and upwardly from the bottom and being substantially vertical adjacent the upper edge thereof, an intermediate vessel having a bottom dimensioned to nest within the bottom of the outer vessel and a part projecting laterally from a side thereof and accommodated within the enlarged upper portion of the outer vessel, an inner vessel in the form of a kettle nested within the intermediate vessel and having an integral spout received within the projecting part of the intermediate vessel, the upper edges of the walls of the outer vessel being inwardly offset at the upper edge thereof to provide a closure receiving shoulder and an opening larger than the bottom to enable the unrestricted insertion and removal of the intermediate vessel, and a closure mounted on the shoulder provided on the outer vessel, said closure comprising a shallow cylindrical vessel the top of which is flat, each of said intermediate and inner vessels being only slightly smaller than and occupying substantially the whole of the interior of the vessel in which it is nested.

3. A camping kit comprising an outer open top culinary vessel having side walls flaring outwardly and upwardly from the bottom and being substantially vertical adjacent the upper edge thereof, an intermediate vessel having a bottom dimensioned to nest within the bottom of the outer vessel and a part projecting laterally from a side thereof and accommodated within the enlarged upper portion of the outer vessel, an inner vessel in the form of a kettle nested within the intermediate vessel and having a spout received within the projecting part of the intermediate vessel, the upper edges of the walls of the outer vessel being inwardly offset at the upper edge thereof to provide a closure receiving shoulder and an opening larger than the bottom to enable the unrestricted insertion and removal of the intermediate vessel, a closure mounted on the shoulder provided on the outer vessel, said closure comprising a shallow cylindrical vessel the top of which is flat, closures for the inner and intermediate vessels, and resilient handles on said closures for cooperating with other closures, said resilient handles being compressible to retain the vessels and closures in nested association when the outer closure is in closing position.

SÖLVE SKERFVING.
AKSEL LINDSTRÖM.